Figure 1:
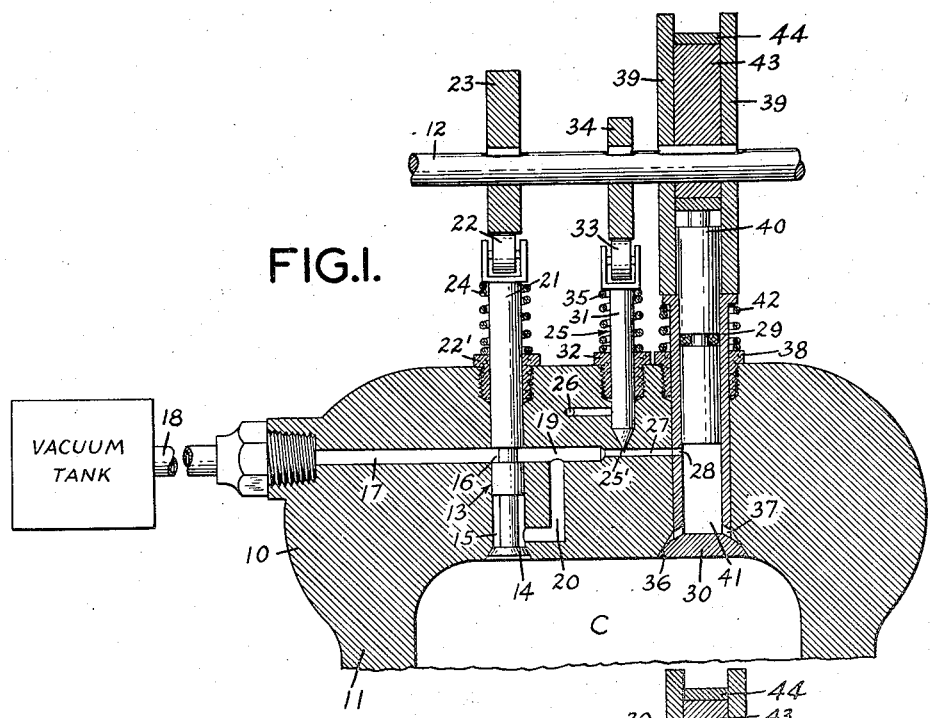

Oct. 17, 1950   G. H. P. HANSEN   2,526,075
DIESEL ENGINE
Filed March 8, 1947   3 Sheets-Sheet 1

INVENTOR
GEORGE H. P. HANSEN
BY
Campbell Brumbaugh & Free
HIS ATTORNEYS

Oct. 17, 1950 G. H. P. HANSEN 2,526,075
DIESEL ENGINE
Filed March 8, 1947 3 Sheets-Sheet 2

INVENTOR
GEORGE H. P. HANSEN
BY
HIS ATTORNEYS

Oct. 17, 1950     G. H. P. HANSEN     2,526,075
DIESEL ENGINE
Filed March 8, 1947                               3 Sheets-Sheet 3
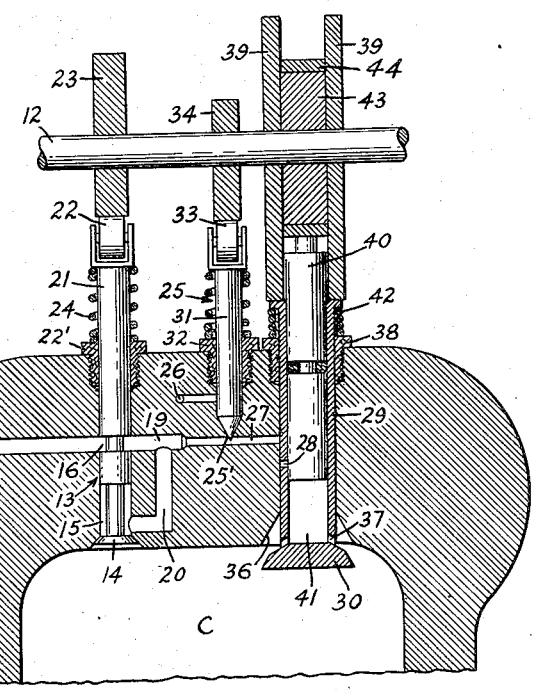
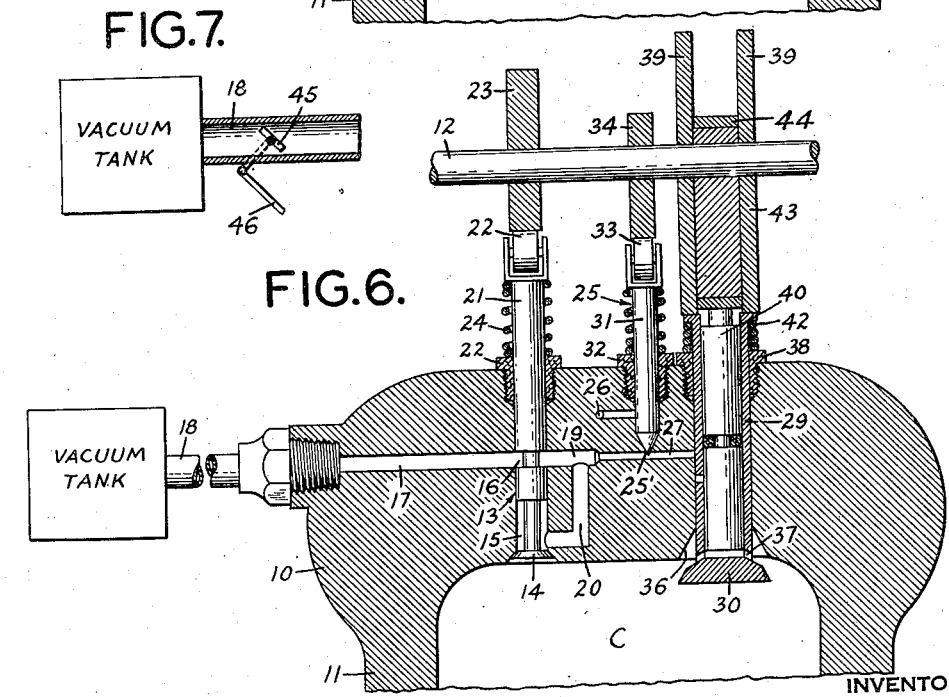
INVENTOR
GEORGE H. P. HANSEN
BY
HIS ATTORNEYS Patented Oct. 17, 1950

2,526,075

UNITED STATES PATENT OFFICE 2,526,075

DIESEL ENGINE

George H. P. Hansen, River Edge Manor, N. J.

Application March 8, 1947, Serial No. 733,365

9 Claims. (Cl. 123—33)

This invention relates to Diesel and semi-Diesel engines, and has particular reference to a charge-forming and charge-feeding mechanism for such engines.

The practical difficulty of carburetting relatively heavy Diesel fuel oils without air precompression is largely the factor which has led to the general adoption of direct fuel injection, but whereas that expedient has improved fuel feeding, it has led to other difficulties and has left the problem of uncontrolled combustion unsolved. One of those difficulties arises from the practical impossibility of constructing a fuel injector valve mechanism capable of accurately measuring and injecting the minute volume of oil required for each cubic inch of piston displacement, i. e., a theoretical ratio of .000071 cubic inch of oil per cubic inch of piston displacement, so that it has become the practice to increase the piston displacement to accord with the smallest volume of oil that is feedable with present equipment, with the result that engines have become larger than required for the desired rated horsepower. The remaining alternative of allowing the fuel-displacement ratio to increase, only results in greater inefficiency, carbonization, and fuel waste, with increased uncontrolled combustion. Accordingly, whereas the fuel injection method has certain advantages, it also has disadvantages over the premixed fuel-air mixture method, so that a system which combines the advantages of both would be desirable.

In accordance with the present invention, methods and apparatus are provided for mixing air with fuel prior to injection into the cylinder of a compression engine without requiring air pre-compressors, but instead utilizing the fuel injection principle, the apparatus being small and compact for building into or simply attaching to the head of each cylinder.

In a preferred embodiment of the invention, certain cam or rocker-actuated valves and pistons are provided on or in the cylinder head for performing the functions of measuring the fuel necessary for combustion, mixing the measured fuel wiht air obtained from the compression stroke of the engine cycle, isolating the mixture in a sealed chamber, agitating the mixture, heating the mixture by the introduction of heat formed by the compression of air during the compression stroke of the engine cycle, and discharging the heated mixture into the combustion area of the engine cylinder at a time best suited for ignition.

It will be seen that the engine charge-forming and charge-feeding system of this invention greatly reduces and frequently eliminates uncontrolled combustion, thereby enabling operation at materially reduced pressures and temperatures with greater thermal efficiency, while providing all the advantages of fuel injection and enabling close control of the fuel displacement ratio so that Diesel or semi-Diesel engines of any desirable size and horsepower may be manufactured economically.

For a more complete understanding of the invention, reference may be had to the accompanying drawings, in which:

Figures 1 to 6, inclusive, are semi-diagrammatic axial sections through a cylinder head of a Diesel or semi-Diesel engine embodying the present invention, the several diagrams showing successive steps in the charge-forming and feeding operations during a complete engine cycle; and Fig. 7 illustrates a speed control valve.

Referring to Fig. 1 of the drawings, numeral 10 designates the head of a cylinder 11 of the engine, which is preferably of the overhead camshaft type, the camshaft being designated 12 and being driven from the engine crankshaft in the usual way by shafting and gearing, not shown.

Figure 3:
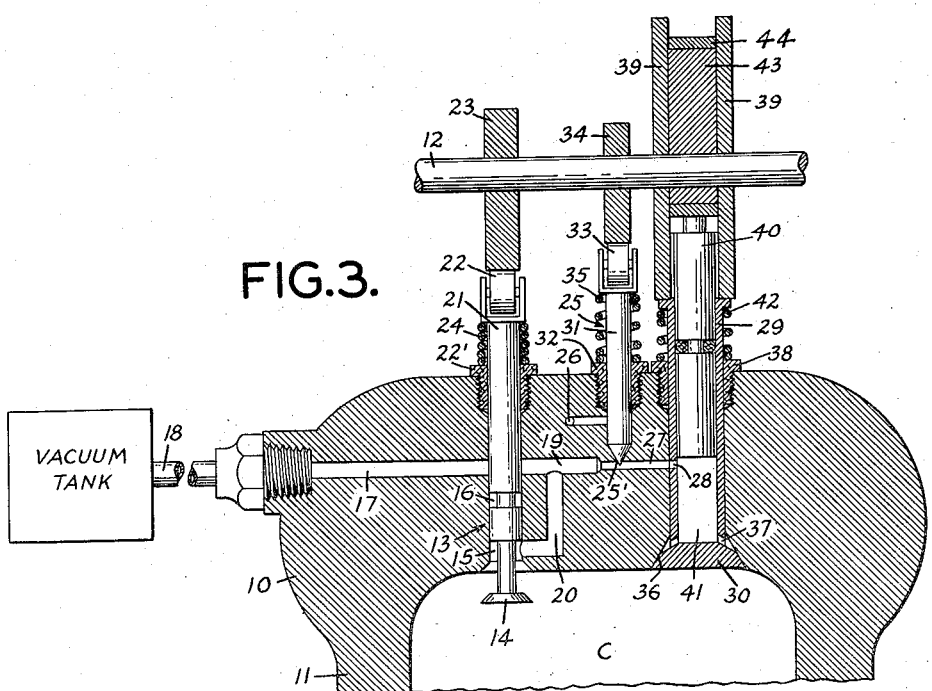

Slidably mounted in the cylinder head 10 is the compression and vacuum cut-off valve 13 shown in closed position with its valve head 14 seated in the corresponding valve seat in the cylinder head 10, or, in actual practice, in a hardened steel nipple or valve seat bushing, not shown, but screwed or shrunk in a suitable recess in the cylinder head 10. The shank of valve 13 is provided with two annular grooves, 15 and 16. Groove 16 normally communicates by bored passage 17 with a suction pipe 18 connected to a source of constant vacuum, such as a vacuum tank connected to the engine air intake manifold. Groove 15 normally communicates with extension 19 of vacuum passage 17 by means of passage 20 and is sufficiently long that when valve 14 is open the passage 19 is in communication with the combustion chamber C, as indicated in Fig. 3, to be described. The stem 21 of valve 13 projects outwardly through a suitable packing gland 22' and is fitted with a cam-following roller 22 engaging cam 23 mounted on camshaft 12. A spring 24 normally urges the roller 22 against cam 23.

Also slidably mounted in cylinder head 10 is the fuel admission valve 25 communicating when open with a fuel supply passage 26 leading to a suitable source of fuel under only sufficient pressure to insure a constant supply, the actual control thereof being effected by other means to be described. Valve 25 discharges through a small port 25' into a small bore passage 27 communicating with passage 19 at one end and at its other end with a port 28 through the wall of the tubular sleeve 29 of charge injection valve 30 to be described. The stem 31 of fuel admission valve 25 projects through packing gland 32 and its roller 33 engages cam 34 on cam shaft 12, a spring 35 normally urging roller 33 against cam 34.

The aforementioned charge-injection valve 30 seats in a valve seat in 36 in the head 10 and the interior of its sleeve 29 discharges through a plurality of diagonal passages 37 merging with grooves on the underside of the head of the valve 30 so that the passages 37 are closed when the valve 30 is closed. The sleeve 29 of valve 30 passes through a packing gland 38 and engages double cam 39 on cam shaft 12 for actuation thereby and is held thereagainst by a spring 42.

Sliding within the sleeve 29 of valve 30 is a plunger 40, actuated by eccentric 43 connected thereto by strap 44 and forming with the head 30 a charge chamber 41 within sleeve 29, as shown. The aforementioned port 28 in the sleeve 29 of valve 30 connected the chamber 41 with the fuel passage 27, until cut off therefrom by plunger 40, as will be described.

In operation of the charge-forming and charge-feeding system of this invention, with initial reference to Fig. 1, that diagram illustrates the condition and position of the valves, plunger and passages as they prevail throughout the engine cycle with the exception of the compression stroke. The compression inlet and vacuum cut-off valve 13, the fuel admission valve 31, and the injector cylinder valve 30 are shown in their closed positions, forming with their seats corresponding tight joints in the cylinder head or valve body 10. The injector plunger 40 is shown in the open position thus forming the carburizing chamber 41 connected to the passage 27 and the passage 19. A continuous vacuum applied to the passage 17 is effective through passages 17, 19, 20, 27 and 28, and the carburizing chamber 41.

Figure 2:
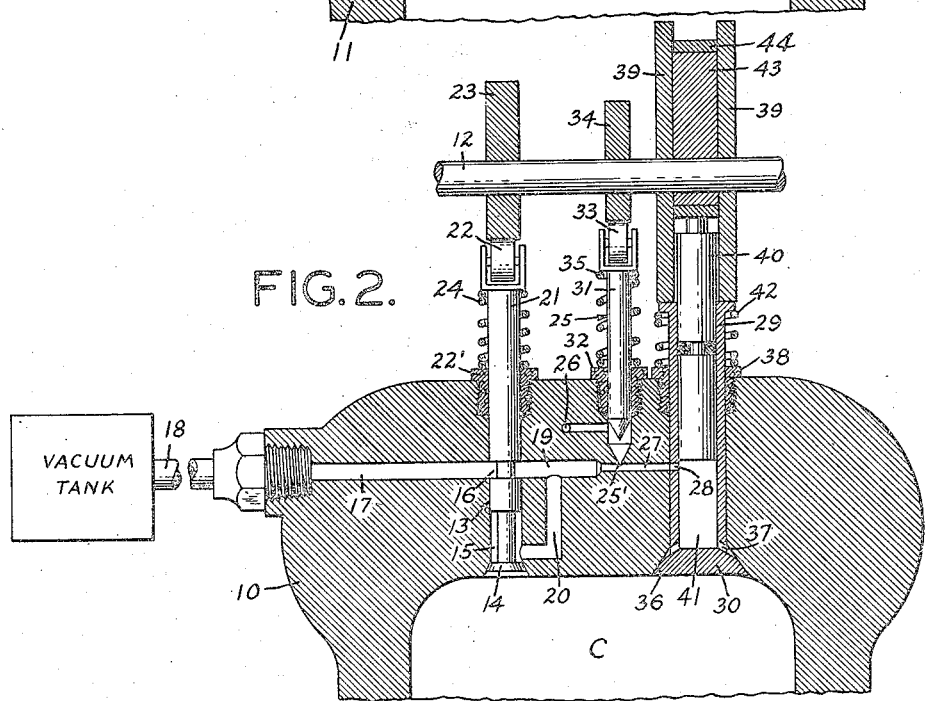

The next step is shown in Fig. 2, which illustrates the valves 13 and 30, plunger 40 and the several passages in the same condition and positions described under Fig. 1 with the exception that the fuel admission valve 31 has been opened sufficiently by cam 34 to allow fuel from the fuel port 26 to be drawn into the passage 27 by the vacuum effective in the passages 17, 16 leading to passage 27. Measurement of the fuel thus supplied to passage 27 is controlled by the size and shape of the fuel passage, by the area of the port 25' between the fuel valve 31 and the passage 27, by the degree of vacuum applied to the passage 17, and by the time the fuel admission valve 31 is allowed to remain open by cam 34, which is normally very short, so that valve 31 may be a rocker-operated poppet valve in many cases.

Referring now to the next step shown by Fig. 3, fuel valve 31 is now closed and hence this diagram illustrates the valves and passages in the condition and positions described under Fig. 1, with the exception that the compression inlet and vacuum cut-off valve 13 has been lowered sufficiently by cam 23 to disconnect vacuum passage 17 from passages 19, 20, 27 and 28 and at the same time to unseat valve 14 to allow air, being compressed by the piston in the combustion area C during the compression stroke of the engine cycle, to flow into and through the passages 20, 19 and 27 toward the carburizing chamber 41. The fuel trapped in passage 27 is forced by this pressure air through port 28 and into the carburizing chamber 41, while at the same time being mixed with the air in its course through passage 27 and port 28 into chamber 41.

Figure 4:
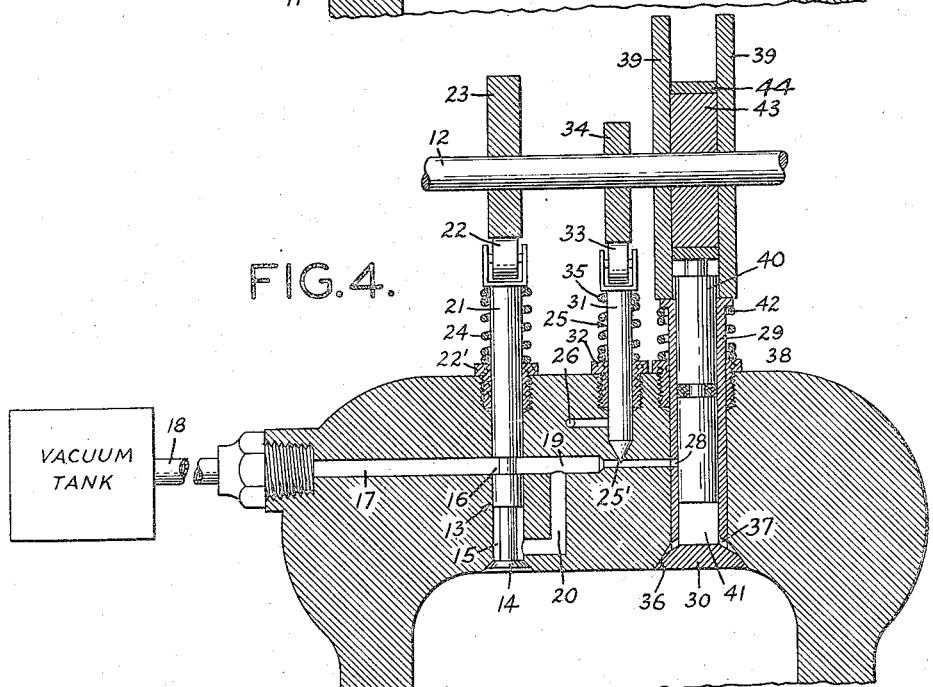

The next step is shown by Fig. 4, which illustrates the valves and passages in the condition and positions described in connection with Fig. 1 with the exception that the compression stroke is still occurring and the injector plunger 40 has been lowered by eccentric 43 so as to cut off passage 28 and thus isolate the fuel-air mixture in carburizing chamber 41. It will be understood that plunger 40 is so actuated before the vacuum connection is restored between passages 17 and 19 by retraction of valve 13. This motion of plunger 40 also causes compression and consequent agitation to the fuel-air mixture in the carburizing chamber 41 and hence further mixing and carburation thereof.

Fig. 5 illustrates the valves and passages in the condition and positions illustrated in Fig. 4, still during the compression stroke, but with the injector valve 29 together with the injector plunger 40 lowered sufficiently by cam 39 and eccentric 43 so that the passages 37 are open to the combustion area C, thus allowing a small amount of the highly-heated air from the combustion area C near the final but non-ignition stage of the same compression stroke to be introduced in the carburizing chamber 41. The mixture in the carburizing chamber 41 is brought to a vaporizing temperature by thus sufficiently opening the injector cylinder valve 29 at a time when the pressure in the combustion area C of the engine cylinder 11 is greater than the pressure in the carburizing chamber 41, thus allowing hot air from the combustion area C of the engine cylinder 11 to pass through the injector cylinder valve passages 37 into the mixture within the carburizing chamber 41.

Fig. 6 illustrates the valves and passages in the condition and positions described in connection with Fig. 5 with the exception that the injector plunger 40 has been lowered sufficiently further by cam 39 to evacuate the contents of the carburizing chamber 41 through the passages 37 into the combustion area C of the engine cylinder. This preheated charge is timed to enter the combustion space C when the air therein has been compressed to the ignition temperature of the charge, and combustion takes place to effect the power stroke, cam 39 and eccentric 43 having retracted plunger 40 and valve 30 to close the latter to the position shown in Fig. 1 before combustion. Fuel injection having been completed as described, the charge-forming and charge-feeding cycle beginning with the conditions shown in Fig. 1 is resumed as described.

It will have been observed that control of the fuel volume-piston displacement ratio is effected with precision which enables exact control of combustion to the exclusion of the uncontrolled combustion that has caused difficulty heretofore. As previously mentioned, the elimination of uncontrolled combustion enables operation at lower temperatures and pressures. For example, whereas Diesel engine cylinder pressures are normally as high as 1500 pounds per square inch, the elimination of uncontrolled combustion according to this invention enables peak pressures on the order of 700 pounds per square inch or less. Thermal efficiency of about 35% is obtained with resultant decrease in temperature. Brake mean effective pressure is about 90, this affording better than .5 horsepower per cubic inch piston displacement. These characteristics enable small, lightweight Diesel and semi-Diesel engines to be constructed for many uses not heretofore available for that type of engine, such as light automotive and aeronautical use.

In the foregoing description the degree of vacuum or suction applied to vacuum passage 17 from the vacuum tank is considered to be substantially constant, whereby substantially constant fuel charges are drawn into passage 27 when valve 31 is opened, so that the engine normally operates at substantially constant speed. The speed of the engine may be varied simply by regulating the degree of suction or vacuum applied to passage 27 while fuel valve 31 is open. Thus, by increasing the degree of suction a large fuel charge is supplied during the time that valve 31 is open, and vice versa. Fig. 7 illustrates a butterfly valve 45 positioned in vacuum pipe 18 and operated by a manual lever 46 to adjust the orifice around the butterfly valve 45 to thereby regulate the degree of suction and the volume of the fuel charge drawn into passage 27. Various other forms of suction regulators performing a function equivalent to valve 45 may be used, and it will be understood that Fig. 7 is merely illustrative of a convenient method of regulating the suction on fuel chamber 27, and consequently the volume of fuel supplied to the engine, which in turn affects the engine speed.

Although the drawings illustrate the invention diagrammatically in the interest of clarity, it is to be understood that adaptation of the system of this invention to actual practice may result in changes in design according to the use, and that the invention is not limited by the embodiment illustrated and described herein, but is susceptible to changes in form and detail within the scope of the appended claims.

I claim:

1. In an internal combustion engine having a cylinder and a piston therein, the combination of means adjacent the combustion chamber in said cylinder forming a fuel-measuring chamber, a source of fuel supply connected to said measuring chamber, a normally closed valve interposed between said measuring chamber and said combustion space, timing mechanism driven by said engine, operative connections between said mechanism and said valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, and operative connections between said timing mechanism and said last-named valve for admitting said fuel-air mixture to said combustion chamber for combustion therein, said valves being operated in sequence in the order named from their aforementioned normal positions.

2. In an internal combustion engine having a cylinder and a piston therein, the combination of means adjacent the combustion chamber in said cylinder forming a fuel-measuring chamber, a source of fuel supply connected to said measuring chamber, a normally closed valve interposed between said measuring chamber and said combustion space, timing mechanism driven by said engine, operative connections between said mechanism and said valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, operative connections between said timing mechanism and said last-named valve for opening the same, a piston in said carburizing chamber, and operative connections between said timing mechanism and said last-named piston for advancing the latter in said carburizing chamber to expel said fuel-air mixture to said combustion chamber for combustion therein, said valves being operated in sequence in the order named from their aforementioned normal positions.

3. In an internal combustion engine having a cylinder and a piston therein, the combination of means adjacent the combustion chamber in said cylinder forming a fuel-measuring chamber, a source of fuel supply connected to said measuring chamber, a normally closed valve interposed between said fuel source and said measuring chamber, a normally closed valve interposed between said measuring chamber and said combustion space, timing mechanism driven by said engine, operative connections between said mechanism and said first-named valve for opening the same to admit fuel from said source to said measuring chamber, operative connections between said timing mechanism and second-named valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, and operative connections between said timing mechanism and said last-named valve for admitting said fuel-air mixture to said combustion chamber for combustion therein, said valves being operated in sequence in the order named from their aforementioned normal positions.

4. In an internal combustion engine having a cylinder and a piston therein, the combination of means adjacent the combustion chamber in said cylinder forming a fuel-measuring chamber, a source of fuel supply connected to said measuring chamber, a normally closed valve interposed between said fuel source and said measuring chamber, a normally closed valve interposed between said measuring chamber and said combustion space, timing mechanism driven by said engine, operative connections between said mechanism and said first-named valve for opening the same to admit fuel from said source to said measuring chamber, operative connections between said timing mechanism and second-named valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, operative connections between said timing mechanism and said last-named valve for opening the same, a piston in said carburizing chamber, and operative connections between said timing mechanism and said last-named piston for advancing the latter in said carburizing chamber to expel said fuel-air mixture to said combustion chamber for combustion therein, said valves being operated in sequence in the order named from their aforementioned normal positions.

5. In an internal combustion engine having a cylinder and a piston therein, the combination of means adjacent the combustion chamber in said cylinder forming a fuel-measuring chamber, a source of fuel supply connected to said measuring chamber, a source of suction connected to said measuring chamber for drawing a charge of fuel from said fuel source into said measuring chamber, a normally open valve interposed in said connections, a normally closed valve interposed between said measuring chamber and said combustion space, timing mechanism driven by said engine, operative connections between said mechanism and said first-named valve for closing the same to disconnect said suction source from said measuring chamber, operative connections between timing mechanism and said second-named valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, and operative connections between said timing mechanism and said last-named valve for admitting said fuel-air mixture to said combustion chamber for combustion therein, said valves being operated in sequence in the order named from their aforementioned normal positions.

6. In an internal combustion engine having a cylinder and a piston therein, the combination of means adjacent the combustion chamber in said cylinder forming a fuel-measuring chamber, a source of fuel supply connected to said measuring chamber, a source of suction connected to said measuring chamber for drawing a charge of fuel from said fuel source into said measuring chamber, a normally open valve interposed in said connections, a normally closed valve interposed between said measuring chamber and said combustion space, timing mechanism driven by said engine, operative connections between said mechanism and said first-named valve for closing the same to disconnect said suction source from said measuring chamber, operative connections between timing mechanism and said second-named valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, operative connections between said timing mechanism and said last-named valve for opening the same, a piston in said carburizing chamber, and operative connections between said timing mechanism and said last-named piston for advancing the latter in said carburizing chamber to expel said fuel-air mixture to said combustion chamber for combustion therein, said valves being operated in sequence in the order named from their aforementioned normal positions.

7. In an internal combustion engine, having a cylinder and a piston therein, the combination of means adjacent the combustion chamber in said cylinder forming a fuel-measuring chamber, a source of fuel supply connected to said measuring chamber, a normally closed valve between said fuel source and said measuring chamber, a source of suction connected to said measuring chamber, a normally open valve interposed in said last-named connections, a normally closed valve interposed between said measuring chamber and said combustion space, timing mechanism driven by said engine, operative connections between said mechanism and said first-named valve for opening the same to admit fuel from said fuel source to said measuring chamber, operative connections between said timing mechanism and said second-named valve for closing the same to disconnect said suction source from said measuring chamber, operative connections between said timing mechanism and said third-named valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, and operative connections between said timing mechanism and said last-named valve for admitting said fuel-air mixture to said combustion chamber for combustion therein, said valves being operated in sequence in the order named from their aforementioned normal positions.

8. In an internal combustion engine having a cylinder and a piston therein, the combination of means adjacent the combustion chamber in said cylinder forming a fuel-measuring chamber, a source of fuel supply connected to said measuring chamber, a normally closed valve between said fuel source and said measuring chamber, a source of suction connected to said measuring chamber, a normally open valve interposed in said last-named connections, a normally closed valve interposed between said measuring chamber and said combustion space, timing mechanism driven by said engine, operative connections between said mechanism and said first-named valve for opening the same to admit fuel from said fuel source to said measuring chamber, operative connections between said timing mechanism and said second-named valve for closing the same to disconnect said suction source from said measuring chamber, operative connections between said timing mechanism and said third-named valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, operative connections between said timing mechanism and said last-named valve for opening the same, a piston in said carburizing chamber, and operative connections between said timing mechanism and said last-named piston for advancing the latter in said carburizing chamber to expel said fuel-air mixture to said combustion chamber for combustion therein, said valves being operated in sequence in the order named from their aforementioned normal positions.

9. In an internal combustion engine having a cylinder and a piston therein, the combination of means adjacent the combustion chamber in said cylinder forming a fuel-measuring chamber, a source of fuel supply connected to said measuring chamber, a source of suction connected to said measuring chamber for drawing a charge of fuel from said fuel source into said measuring chamber, a normally open valve in said connections means for regulating the degree of suction to vary the volume of the fuel charge drawn into said measuring chamber, a normally closed valve interposed between said measuring chamber and said combustion space, timing mechanism driven by said engine, operative connections between said mechanism and said valve for opening the same during the compression stroke of said piston to admit compressed air from said combustion chamber to said measuring chamber, means forming a carburizing chamber adjacent said combustion chamber, a normally open valve between said measuring chamber and said carburizing chamber, whereby said compressed air forces said fuel from said measuring chamber into said carburizing chamber, operative connections for closing said last-named valve to isolate said fuel-air mixture in said carburizing chamber, a normally closed valve interposed between said carburizing chamber and said combustion chamber, and operative connections between said timing mechanism and said last-named valve for admitting said fuel-air mixture to said combustion chamber for combustion therein, said valves being operated in sequence in the order named from their aforementioned normal positions.

GEORGE H. P. HANSEN.

REFERENCES CITED

The following references are of record in the file of this patent:

UNITED STATES PATENTS

| Number | Name | Date |
| --- | --- | --- |
| 785,240 | Trinkler | Mar. 21, 1905 |
| 1,475,370 | Danckwortt | Nov. 27, 1923 |
| 1,674,730 | Leonard | June 26, 1928 |
| 1,766,389 | Kramling | June 24, 1930 |
| 2,002,482 | Kimball | May 21, 1935 |
| 2,002,483 | Kimball | May 21, 1935 |
| 2,116,596 | Coffey | May 10, 1938 |
| 2,130,666 | Coffey | Sept. 20, 1938 |

FOREIGN PATENTS

| Number | Country | Date |
| --- | --- | --- |
| 87,279 | Austria | Feb. 10, 1922 |